May 2, 1933.   J. C. McFARLAND   1,906,988
MEASURING APPARATUS
Filed Aug. 28, 1931
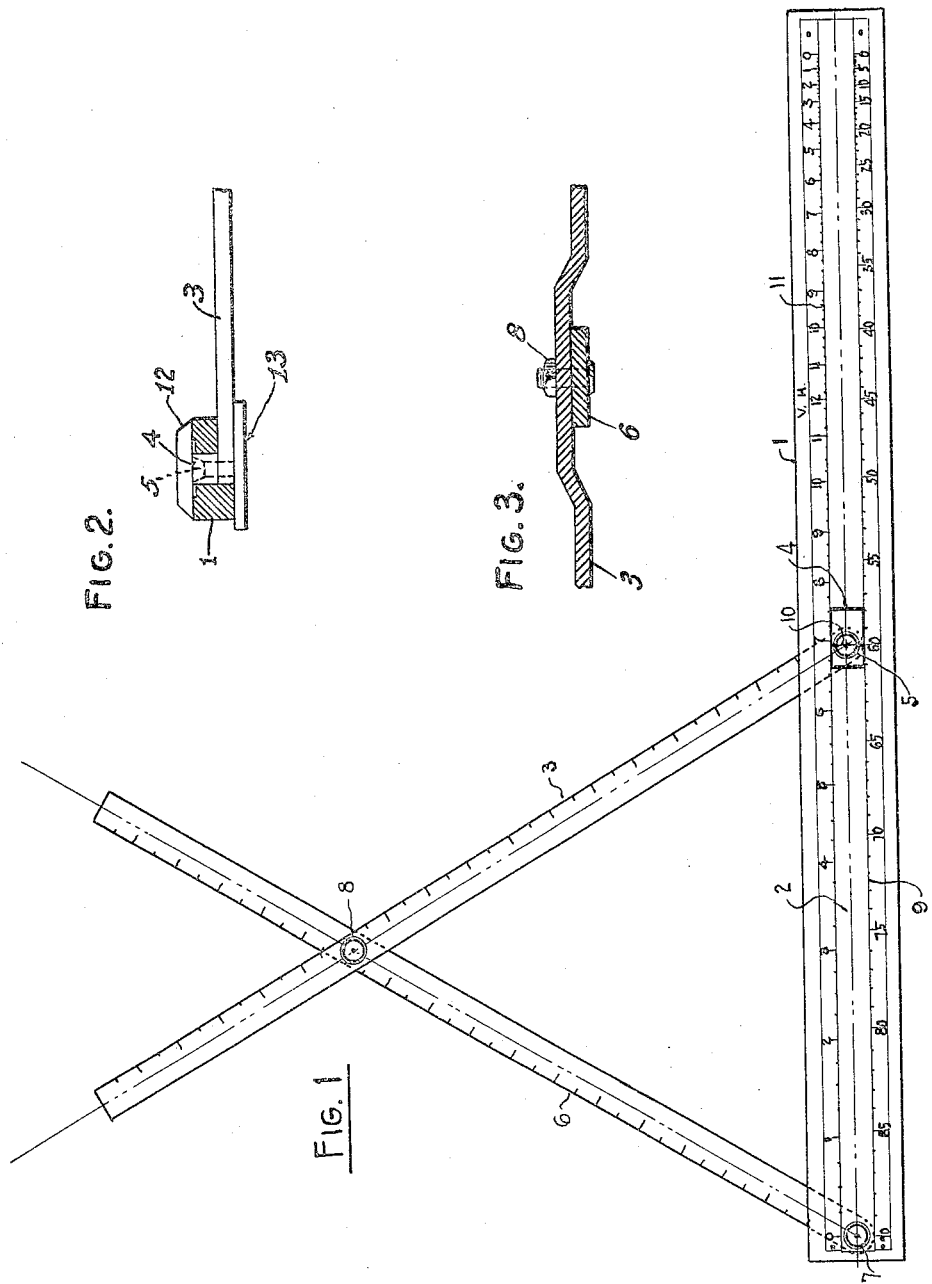
INVENTOR.
James C. McFarland
BY William B. Jasper
ATTORNEYS.

Patented May 2, 1933

1,906,988

UNITED STATES PATENT OFFICE

JAMES C. McFARLAND, OF CRAFTON, PENNSYLVANIA

MEASURING APPARATUS

Application filed August 28, 1931. Serial No. 559,825.

This invention relates to improvements in instruments which are adjustable to provide a simple and expedient method of establishing to any base, any angle or bevel embraced between the limits of approximately zero degrees and 90°.

It is among the objects of this invention to provide an instrument of simple, durable, and light construction which shall be adapted to establish angles or bevels of different degrees by the adjustment of a single moveable part.

Briefly the invention consists of a combination straight edge and graduated scale having two arms, one of which is pivoted at one end of the base scale, and the other of which is pivoted to a slide operable in a slot provided in said scale, said arms being pivoted together at a point remote from the base member.

The object and purpose of the invention will become more apparent from a consideration of the accompanying drawing constituting a part hereof in which like reference characters designate like parts and in which:

Figure 1 is a top plan view of an instrument with adjustable arms embodying the principles of this invention;

Figure 2 is an enlarged cross-sectional view of the base and slide member; and

Figure 3 a partial cross-section taken through the pivot connection of the arms.

With reference to the several figures of the drawing, the structure therein illustrated comprises a base 1 consisting of a graduated scale having a slot 2 extending longitudinally thereof and terminating short of the end, the slot being of L shape as shown in Figure 2 to receive the arm 3 which is attached to a slide 4 by means of the pivot pin 5. The slide member 4 is adapted to move freely in the slot to adjust the angularity of the arm member 3 and its cooperating arm member 6 in a manner hereinafter described.

The arm 6 is pivoted at 7 to one end of the member 1, this being a fixed pivot and the arms 3 and 6 are pivoted together at 8, this likewise being a fixed pivot, the arm 3 being off-set or crimped in the manner shown in Figure 3 to dispose both of the arms in the same plane.

With reference to Figure 1 of the drawing, the base member 1 is provided with graduations 9 designating the degrees to which the slide block 4 is adjustable and is set so that its indicating line 10 registers with the degree of a particular angle to which it is adjusted as, for example, 60° shown in the figure of the drawing. The base member 1 is also provided with graduations designated at 11 which represent bevels commonly employed in structural drawing work or in making layouts in the shop.

With reference to Figure 2 of the drawing, a transparent shield 12 is placed and secured on the graduated side of the base member 1 and a straight edge 13 having a graduated scale is secured to the bottom of the member 1.

The arms 3 and 6 are graduated to any convenient scale, and scales of various lengths and different measurements may be clamped to these arms if desired.

The operation of the above described instrument is briefly as follows:

As previously explained, the arm 6 is secured to the fixed pivot 7 at one end of the base member 1 and the arm 3 which is pivoted to arm 6 at 8 is also pivoted at 5 to the slide block 4.

To establish any angle between the limits of approximately zero and 90° it is only necessary to move the block 4 so that the indicator 10 registers with the graduations 9 as for example, 60° shown in the drawing. In the said position, the angle established is 60° and similarly by sliding the block 4 so that the line 10 registers with any other graduation 9, the angle designated by the graduation will be the angle established by the arms 3 and 6 to the base 1.

Similarly, if the instrument is to be employed for structural drawing use or shop layout work, the indicator line 10 of the slide block 4 will be set to register with a particular graduation 11 which produces the bevel desired.

By employing the transparent shield on top of the graduated base of the member 1, the graduations are protected and the shield at the same time functions as a retaining element for the slide block 4.

The straight edge 13 at the base of the member 1 can be employed for marking out a base line and generally for layout work in which the instrument is utilized. It may also be graduated in any desired manner.

I am aware that various forms of rules, combination squares, and adjustable measuring instruments have been heretofore proposed for special application, but none of them embody the simplicity of construction and the single adjusting means utilized in the instrument herein described and characterized by the appended claim.

I claim:

A combination angle and bevel comprising a base member having graduations designating angles and bevels and having a slot extending longitudinally thereof and having a cut away portion on one side joining said slot, a straight edge on the bottom of said base member and spaced from said cut away portion to provide an entrance into said slot, and a transparent shield on the top thereof, a slide block movably disposed within said slot between said base member and shield, a plurality of arms one of which is pivoted to said base at one end of the slot and the other of which extends through said cut away portion and is pivoted to said slide block, said arms being pivotally connected at a fixed point at their extended ends.

In testimony whereof I have hereunto set my hand.

JAMES C. McFARLAND.